UNITED STATES PATENT OFFICE 2,315,557

COMPOSITION OF MATTER AND METHOD FOR ITS PREPARATION

[Inventor], Swarthmore, Pa., assignor to The United Gas Improvement Company, a corporation of Pennsylvania No Drawing. Application April 18, 1940, Serial No. 330,397

12 Claims. (Cl. 260—488)

This invention pertains to new compositions of matter and to methods for their preparation.

The invention pertains more particularly to halogen derivatives of substituted styrenes, and to processes for the preparation of these new derivatives.

The invention pertains still further to halohydrines and halogen-ester derivatives of substituted styrenes, and methods for their preparation.

This invention is based upon the discovery that halogen derivatives of substituted styrene, having the structural formula

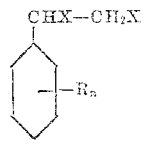

(in which R represents alkyl, aryl, or alkyl-aryl groups, $n$ represents the fact that one or more substituents may be present in the nucleus, one X represents chlorine, bromine, or iodine; and the other X represents hydroxy or a fatty acid radical) may be prepared in excellent yields by the action of hypohalous acids, either as such or generated in situ, upon substituted styrenes.

In addition to halogen derivatives of substituted styrene wherein the substituent groups are present in the benzene ring (as denoted by the symbol $R_n$ in the foregoing structural formula), halogen derivatives of substituted styrene wherein one or more substituent groups are also present in the side chain (i. e., introduced in the ethylenic linkage of the substituted styrene structural unit) may be readily prepared in accordance with my invention. Such derivatives will have the following structural formula:

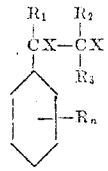

(in which R, $n$ and X, have the same meanings as before; and $R_1$, $R_2$ and $R_3$ each represents a substituent selected from the groups consisting of hydrogen, alkyl, aryl and aralkyl groups.)

It is an object of the present invention to provide as new compositions of matter, halogen derivatives of substituted styrenes, and processes for their preparation and purification. More specifically, it is an object of the invention to provide new organic compounds comprising fluids which are suitable for use alone or in combination with other substances as plasticizers in the formulation of lacquers, particularly those lacquers containing cellulose esters. Still another object is the provision of new compounds particularly valuable as plasticizers for synthetic and natural resins and plastics in general. Another object is to provide new compounds which may be used as solvents for the refining of oil fractions and natural or synthetic resins, and as high-boiling solvents in the preparation of paints, varnishes, lacquers, and similar coating compositions. A still further object of the invention is to provide new compounds which may be used as intermediates in chemical synthesis. Another object is the provision of a process for effecting reactions between substituted styrenes and hypohalous acids, or substances capable of generating hypohalous acids. Other objects and advantages of the invention will be apparent to those skilled in the art from the following description.

Examples of styrenes in which the substituent group, or groups, are present in the nucleus may be represented as follows:

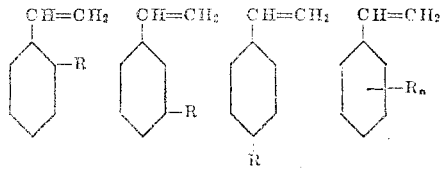

in which R represents alkyl, aryl, or alkyl-aryl groups, and where $n$ represents the fact that one or more substituents may be present in the nucleus.

The methyl styrenes, in which the methyl group is located in the nucleus:

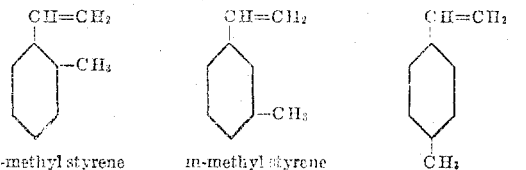

o-methyl styrene    m-methyl styrene    p-methyl styrene are particularly well adapted to the preparation of substituted styrene halohydrines.

The substituted styrenes employed in the preparation of these new compounds may be in the form of pure or commercially or technically pure substituted styrenes, or in the form of a solution or fraction of any desired concentration.

These substituted styrenes may be obtained by the distillation of so-called "light oil" from oil gas, carburetted water gas, cracked refinery gases, or coal gas, as well as from other sources. "Light oil" comprises the oily condensates and/or distillate from tar condensates obtained during the manufacture of hydrocarbon-containing gas by methods which may involve the pyrolytic decomposition of hydrocarbon oil, with or without the aid of catalysts. Such fractions will be referred to herein, generally, as light oil substituted styrene fractions. The substituted styrene fractions obtained in the manufacture of oil gas are particularly suitable.

Para-methyl styrene fractions obtained by the distillation of light oil and having boiling ranges between 160 and 180° C. have been satisfactorily employed for the production of these new compounds. Especially desirable results are obtained when employing para-methyl styrene fractions having boiling ranges between 165 and 175° C., while even more desirable results are obtained when the para-methyl styrene fractions employed have boiling ranges between 167 and 173° C.

Meta-methyl styrene fractions having boiling ranges between 172 and 178° C. may be employed for the production of these new compounds with excellent results.

A comparable degree of purity is preferred when using other substituted styrenes for this purpose.

Instead of relatively pure fractions containing a particular substituted styrene, fractions containing two or more substituted styrenes may be employed in the process. For example, a fraction obtained by the distillation of light oil from oil gas, and containing both para-methyl styrene and meta-methyl styrene, may be used in the process with excellent results. The mixed halogen derivatives thus obtained, for example the mixed halohydrines, may be used as such, or they may be separated by any desired method, such as by fractionation under reduced pressure or by azeotropic distillation.

In general, the initial step in the preparation of substituted styrene halohydrines, or mixtures containing substituted styrene halohydrines, or substituted styrene halogen-esters, or mixtures thereof, comprises contacting the desired substituted styrene, or mixture containing at least one substituted styrene, with a hypohalous acid, or with a substance capable of generating hypohalous acid in situ.

The methods which have been developed for the preparation of chlorohydrines from substituted styrenes will serve to illustrate the preparation of substituted styrene halohydrines in general. Similarly, the methods which have been developed for the preparation of chloroacetates from substituted styrenes will serve to illustrate the preparation of halogen-ester derivatives of substituted styrenes in general.

Chlorohydrines of substituted styrenes are formed when the desired substituted styrene is contacted with dilute aqueous solutions of hypochlorous acid for example at normal or reduced temperatures. Conditions which promote intimate contact of the two phases, such as efficient agitation, accelerate the formation of the desired chlorohydrine.

Chloroacetates of substituted styrenes are formed when the desired substituted styrene is contacted with aqueous solutions of hypochlorous acid and concentrated acetic acid for example at normal or reduced temperatures. As in the case of the chlorohydrine, conditions which promote intimate contact of the phases accelerate the formation of the desired chloroacetate.

The hypochlorous acid used in the reaction may be obtained in various ways, such as by the use of chlorine, sodium hypochlorite, or calcium hypochlorite as starting materials.

Numerous methods have been devised for the preparation of hypochlorous acid from chlorine. Chief among these is the reaction of chlorine with water according to the following equation.

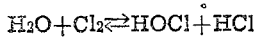

Although the proportions of hypochlorous and hydrochloric acids actually present under normal operating conditions are quite small, the velocity of the reaction between the hypochlorous acid and the substituted styrene is so much greater than that between chlorine, or hydrochloric acid, and the substituted styrene, that it is possible to obtain good yields of the desired chlorohydrine.

As the reaction is usually carried out, chlorine and the desired substituted styrene are separately passed into a suitable vessel containing water, the substituted styrene being maintained in slight excess. The solution is thoroughly agitated throughout the course of the reaction.

The reaction is continued until a substituted styrene chlorohydrine concentration of approximately 5% is attained. At this point, the reaction of chlorine with the substituted styrene to give the corresponding dichloride is found to proceed at an appreciable rate. To avoid losses due to secondary reactions of this type, therefore, the practical limit of substituted styrene chlorohydrine concentration in the reaction mixture is, in the range of 5 to 10%, the maximum concentration depending, among other things, upon the reactivity of the specific substituted styrene, or substituted styrene mixture, employed in the reaction.

Apparently the most important reaction variable is the degree of agitation of the reaction mixture throughout the course of the reaction. Thorough agitation appears to be practicably essential for good yields. The use of a turbo-mixing type of agitator has been found to be a very satisfactory method for securing a satisfactory degree of agitation of the reaction mixture. The turbo-mixing unit employed in my experiments consisted of a multiple-blade agitator revolving within a concentric ring supporting numerous vanes, which served to further subdivide the liquid currents set up by the agitator blades. In practice, I found it advisable to introduce the chlorine and substituted styrene reactants in the form of streams immediately underneath the agitator blades in order to secure an intimate contact between the reactants in the liquid phase.

Other methods of agitation which may be employed are the introduction of the reactants into the reaction vessel through fine orifices under pressure, as well as the use of certain inert gases (e. g., nitrogen or carbon dioxide) for agitating the reaction mass. An alternative method comprises introducing the reactants into a centrifugal pump operating at a relatively high speed.

The temperature employed in the reaction may be varied over very wide limits, although temperatures above 80° C. are rarely employed. Excellent results are secured by the use of temperatures in the range of 5 to 40° C.

Catalysts such as aqueous solutions of copper chloride or ferric chloride may be employed if desired, although excellent yields may be obtained in the absence of catalysts.

Other methods which have been developed for the preparation of hypochlorous acid from chlorine include the following.

1. The reaction of chlorine with water in the presence of mercuric oxide.

2. The preparation of chlorine oxide from chlorine, followed by the reaction of the chlorine oxide with water to form an aqueous solution of hypochlorous acid.

3. Passing chlorine into an aqueous solution of sodium carbonate and sodium bicarbonate.

4. Passing chlorine into an aqueous alkaline solution.

5. Passing chlorine into an aqueous alkaline solution of a metallic hypochlorite.

6. Passing chlorine into water in the presence of a material capable of neutralizing the hydrochloric acid formed, such as disodium hydrogen phosphate.

Methods which have been developed for the preparation of hypochlorous acid solutions from sodium hypochlorite include the following.

1. The reaction of sodium hypochlorite with a weak acid, such as boric acid.

2. The reaction of an alkaline solution of sodium hypochlorite with sodium bicarbonate.

3. The reaction of sodium hypochlorite with chlorine in the presence of water.

Methods which have been developed for the preparation of hypochlorous acid solutions from calcium hypochlorite include the following.

1. The action of weak acids, such as carbon dioxide, upon an aqueous solution of calcium hypochlorite.

2. The reaction of chlorine with a dilute aqueous solution of calcium hypochlorite in the presence of an alkali, such as sodium hydroxide.

Various modifications of these methods also may be employed for the production of substituted styrene chlorohydrines. For example, the desired substituted styrene and chlorine may be alternately passed into an aqueous solution of cupric chloride with good agitation, the time interval between successive additions being relatively short.

Substituted styrene chlorohydrines may be prepared by the reaction of the desired substituted styrene with chlorine in the presence of excess steam and water at a temperature of 100° C., or above.

Another method consists of the use of certain metallic chlorides, such as ferric or cupric chlorides, as the source of the chlorine used in the reaction. The reaction is suitably carried out at temperatures of 100° C., or higher, and in the presence of water or steam. The reduced chlorides may be subsequently oxidized with air and treated with hydrochloric acid, after which they may be again employed in the reaction.

Substituted styrene chlorohydrines may be prepared by passing a mixture of the desired substituted styrene, chlorine, and steam into a reaction vessel at a temperature of approximately 100° C., and in the presence of materials, such as manganese dioxide, which are capable of reacting with the hydrochloric acid formed in the reaction to yield chlorine, which is again converted into a mixture of hypochlorous and hydrochloric acids. In this way, substantially all of the chlorine charged to the system is ultimately converted to the desired chlorohydrine.

The use of certain solvents which are immiscible with water, such as benzol or carbon tetrachloride, in the process favors the formation of the desired chlorohydrine. The immiscible solvent tends to remove the chlorohydrine from the aqueous solution, thus inhibiting the formation of undesirable polychlorinated derivatives. In the case of highly-concentrated substituted styrene fractions the added solvent considerably reduces this concentration, which has been found to be advantageous in certain cases.

The production of undesirable chlorinated derivatives, such as substituted styrene hydrochlorides, may be further inhibited by the addition of certain compounds to the reaction mixture which are capable of neutralizing the hydrogen chloride formed during the course of the reaction. Examples of such compounds are the inorganic alkalies, such as ammonia, sodium carbonate, calcium carbonate, aluminum hydroxide, etc.

The reaction may be carried out in any desired manner, such as batch, multiple batch, batch countercurrent, or continuous countercurrent methods. The reaction may be carried out in a plurality of reaction vessels, if desired, or it may be carried out in one or more towers, which may be packed with any suitable material, or which may be provided with baffles, bubble trays, or other devices to insure thorough mixing of the reactants.

The reaction may be carried out at atmospheric, subatmospheric, or superatmospheric pressures. Excellent results are obtained by conducting the reaction at atmospheric pressure.

Substituted styrene chlorohydrines may be isolated from the reaction mixture by extraction with a suitable solvent, such as benzene or diethyl ether, after which the solvent is removed from the product by distillation. The substituted styrene chlorohydrine may be further purified, such as by fractional distillation under reduced pressure, or by azeotropic distillation, if desired.

An alternative method consists of the addition of certain inorganic salts, such as sodium chloride, to the reaction mixture, after which the substituted styrene chlorohydrine is removed by decantation. The substituted styrene chlorohydrine may then be further purified, if desired.

The preparation of substituted styrene halohydrines by the reaction of a substituted styrene with a dilute aqueous solution of hypohalous acid is illustrated by the following example.

*Example 1*

A 333 gram portion of a light oil fraction obtained by the fractionation of a light oil obtained in the manufacture of oil gas, and containing 260 grams of para-methyl styrene, was slowly added to a dilute aqueous solution of hypochlorous acid during a period of one and three quarter hours with good stirring at room temperature.

The reaction mixture was extracted with ether, after which the ether extract was washed with a dilute aqueous solution of sodium carbonate. The mixture was permitted to stratify and the aqueous layer removed and discarded. The ether extract was washed with water until neutral, then dried with anhydrous sodium sulfate. Ether was removed from the crude reaction product by distillation at atmospheric pressure, after which the residual liquid was distilled under reduced pressure. Approximately 200 grams of para-methyl styrene chlorohydrine was obtained, with the following physical properties.

Boiling range=109–117° C. at 6 mm., absolute
Density $(d\ 20/4) = 1.162$
Refractive index $(N\ 20/D) = 1.547$ Alternative methods for the preparation of substituted styrene halohydrines include the reaction of the desired substituted styrene with certain compounds capable of generating hypohalous acid in situ. Examples of such compounds are tertiary butyl hypochlorite and monochlorourea.

Tertiary butyl hypochlorite

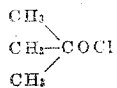

reacts with substituted styrenes in the presence of water, or a dilute organic acid, to form the corresponding substituted styrene chlorohydrines. A by-product of the reaction is tertiary butyl alcohol, which may be separated from the reaction product by suitable means, such as by fractional distillation, and re-used in the process. Tertiary butyl alcohol may therefore be regarded as a carrier for hypochlorous acid in the reaction. The cycle of operations may be represented as follows:

1. The reaction of hypochlorous acid with tertiary butyl alcohol to form tertiary butyl hypochlorite.

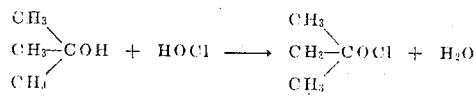

2. The reaction of tertiary butyl hypochlorite with a substituted styrene in the presence of water, or a dilute organic acid, to form the desired substituted styrene chlorohydrine

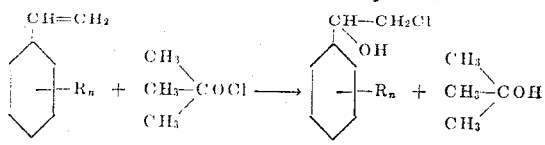

The use of tertiary butyl hypochlorite for the preparation of substituted styrene chlorohydrines permits the use of solutions of hypochlorous acid of any desired concentration, as tertiary butyl hypochlorite is soluble in all proportions in the various substituted styrenes. The reaction between hypochlorous acid and the desired substituted styrene may therefore be carried out in a homogeneous system, as the hypochlorous acid is generated at the same rate at which it reacts with the substituted styrene. The production of undesirable chlorinated by-products, such as dichlorides and hydrochlorides, is correspondingly reduced.

A small quantity of an organic acid, for instance acetic acid, may be used in the process if desired, in order to increase the rate of the reaction.

This process of producing substituted styrene halohydrines is illustrated by the following examples.

*Example 2*

A 518 gram portion (7 mols) of tertiary butyl alcohol (M.P.=$-24°$ C.) was stirred with 2800 cc. of a 10% aqueous solution of sodium hydroxide at a temperature of $-10°$ C. for a period of eight hours, a rapid stream of chlorine gas being passed into the mixture during this period. A total of 411 grams of chlorine (5.8 mols) was observed. The mixture was then permitted to stand for a short period of time, whereupon stratification occurred. The upper layer, which was a deep yellow oil, was separated from the lower aqueous layer and washed twice with cold water to remove any unreacted chlorine and tertiary butyl alcohol. The oily layer was then dried over anhydrous sodium sulfate and distilled at atmospheric pressure. A total of 510 grams of tertiary butyl hypochlorite, with a boiling point of 78° C., was obtained. The product was a pale yellow, mobile liquid with a characteristic pungent odor.

A mixture of 110 grams of a 70% para-methyl styrene fraction obtained by the fractionation of light oil from oil gas, and containing 77 grams (0.65 mol) of para-methyl styrene, and an equimolecular quantity of water was added to a three-neck flask provided with a reflux condenser and an agitator. To this mixture was added 71 grams (0.65 mol) of tertiary butyl hypochlorite with good agitation during the course of one hour at room temperature. Mild external heat was then applied to the reaction vessel for an additional period of one hour.

A small amount of water was separated from the oily reaction product, after which it was dried with anhydrous sodium sulfate and distilled in vacuo. Approximately 50 grams of para-methyl styrene chlorohydrine was obtained, with the following physical properties.

Boiling range=109–117° C. @ 6 mm., absolute
Density ($d$ 20/4) =1.162

*Example 3*

A mixture of 152 grams of a freshly distilled 78% light oil methyl styrene fraction, obtained by the fractionation of light oil and containing 118 grams (1 mol) of para-methyl styrene, and 121 grams of a 90% tertiary butyl hypochlorite solution containing 118 grams (1.1 mol) of tertiary butyl hypochlorite was cooled to 0° C. and then added dropwise to a mixture of 1500 cc. of water and 60 grams of acetic acid during the course of two hours. The temperature of the reaction mixture did not rise above room temperature during this period.

The reaction mixture was stirred for an additional period of ten hours. At this point, only a trace of tertiary butyl hypochlorite, or of hypochlorous acid, was present in the reaction mixture, as measured by its reaction with potassium iodide and acetic acid.

The brown, oily product was removed from the aqueous solution by decantation, after which it was washed twice with ice water to remove the residual tertiary butyl hypochlorite, as well as the tertiary butyl alcohol formed as a by-product of the reaction. It was then dried with anhydrous sodium sulfate and distilled under reduced pressure.

A total of 86 grams of product was obtained, having the following physical properties.

Boiling range=115–122° C. @ 5 mm.
Density ($d$ 20/4) =1.1537
Refractive index=1.5423
Chlorine content (analysis) =20.5, 20.4%
Chlorine content (theoretical) =20.8%

The physical contents of this material indicate that it is a mixture of methyl styrene chlorohydrine and methyl styrene chloroacetate, with methyl styrene chlorohydrine predominating. If desired, the chlorohydrine and chloroacetate thus prepared in admixture may be separated by any convenient means such as by fractionation, preferably under reduced pressure.

The process of producing substituted styrene haloacetates is illustrated by the following example:

*Example 4*

A 108.5 gram (1 mol) portion of tertiary butyl hypochlorite was slowly added with good agitation to 151 grams of a 78% light oil p-methyl styrene fraction, obtained by the fractionation of the condensate obtained in the manufacture of oil gas, containing 118 grams (1 mol) of p-methyl styrene at a temperature of 0° C. This mixture was then added dropwise during a period of one hour to a mixture of 60 grams (1 mol) of glacial acetic acid and 7 grams of water.

When this addition has been completed, the reaction mixture was further agitated for a period of 12 hours at a temperature of 0° C. A 500 gram portion of ice water was then added to remove the unchanged tertiary butyl hypochlorite, as well as the tertiary butyl alcohol formed as a by-product of the reaction. The mixture was then allowed to stratify and the water layer discarded. This washing procedure was repeated, after which the dark brown, oily product was dried over anhydrous sodium sulfate and distilled under reduced pressure.

A total of 96 grams of p-methyl styrene chloroacetate was obtained. This was redistilled, giving a product having the following physical properties Boiling range=115–121° C. @ 4 mm.
Density ($d$ 20/4)=1.1360
Refractive index ($n$ 20/$d$)=1.52150
Chlorine analysis (actual)=16.8% by weight
Theoretical chlorine content=16.7% by weight The product obtained from this run was a pale yellow, viscous liquid with an agreeable odor. It consisted mainly of the B-chloro isomer.

Monochlorourea

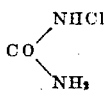

also reacts with substituted styrenes in the presence of water or a dilute organic acid, to form the corresponding substituted styrene chlorohydrines. A by-product of the reaction is urea, which may be separated from the reaction product and re-used in the process. This cycle of operations may be represented by the following series of equations.

1. The reaction of chlorine with urea to form monochlorourea.

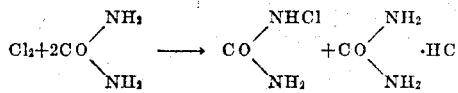

In order to obtain a product free from urea hydrochloride, the reaction may be carried out in the presence of certain materials which are capable of reacting with the hydrogen chloride liberated during the course of the reaction, such as calcium carbonate. This process is illustrated by the following equations

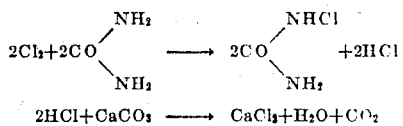

$2HCl + CaCO_3 \longrightarrow CaCl_2 + H_2O + CO_2$

2. The reaction of monochlorourea with a substituted styrene in the presence of water, or of a dilute acid, to form the corresponding substituted styrene chlorohydrine.

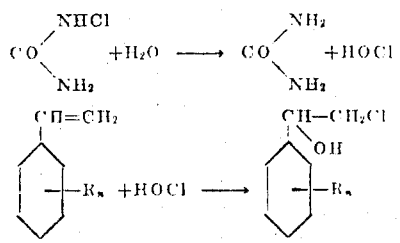

The reaction between monochlorourea and substituted styrenes proceeds even in the absence of a catalyst. In the presence of a catalyst, however, the reaction proceeds to completion at a satisfactory rate, and good yields of the desired substituted styrene chlorohydrine may be readily obtained. It has been found that organic acids in general, such as acetic acid, are satisfactory catalysts for this purpose, as they are soluble in all proportions in the reaction medium. In addition, certain other acidic substances, such as urea hydrochloride, have also been found to be effective catalysts. The use of urea hydrochloride as a catalyst is particularly desirable, as it is obtained as a by-product during the preparation of monochlorourea.

It has been found that the use of urea hydrochloride as a catalyst in concentrations greater than 10% is undesirable, as the hydrogen chloride liberated reacts with the hypochlorous acid, liberated by the monochlorourea present, to form nascent chlorine. The chlorine so generated reacts with a portion of the substituted styrene present to form the corresponding substituted stryrene dichloride, thus contaminating the product.

By the use of monochlorourea for the preparation of substituted styrene chlorohydrines, solutions of hypochlorous acid of any desired concentration may be obtained, as monochlorourea is soluble in all proportions in the various substituted styrenes. The process also has the advantage that the reaction between hypochlorous acid and the desired substituted styrene can be carried out in a homogeneous solution, as the hypochlorous acid is generated at the same rate at which it reacts with the substituted styrene.

This process of producing substituted styrene halohydrines is illustrated by the following examples.

*Example 5*

A mixture of 240 grams of urea, 120 cc. of water, and 120 grams of calcium carbonate was added to a flask immersed in an ice-salt bath. The mixture was treated with a rapid stream of chlorine for a period of three hours with good stirring. A total of 129 grams of chlorine was absorbed during this period.

The reaction mixture as diluted with 500 cc. of water and filtered through glass wool to remove all extraneous material. The aqueous solution of monochlorourea thus obtained was pale yellow in color.

A 333 gram portion of a light oil fraction containing 260 grams (2.2 mols) of para-methyl styrene was slowly added to 2195 cc. of an 8.6% aqueous solution of monochlorourea, containing 100 grams of acetic acid, during a period of one and three quarter hours with good stirring at room temperature. The reaction was then continued for an additional period of ten and one quarter hours.

The reaction mixture was extracted with ether, after which the ether extract was washed with a 5% aqueous solution of sodium carbonate. The mixture was permitted to stratify and the aqueous layer removed and discarded. The ether extract was washed with water until neutral, then dried with anhydrous sodium sulfate.

Ether was removed from the crude reaction product by distillation at atmospheric pressure, after which the residue was distilled under reduced pressure. A total of 200 grams of para-methyl styrene chlorohydrine was obtained, representing a yield of 58.7%. The product obtained had the following physical properties.

Boiling range = 109–117° C. @ 6 mm., absolute
Density ($d\ 20/4$) = 1.1622
Refractive index ($n\ 20/D$) = 1.5472
Chlorine content (analysis) = 21.8%
Chlorine content (theoretical) = 20.8%

Example 6

A 333 gram portion of a freshly redistilled light oil para-methyl styrene fraction, obtained by the fractionation of light oil from oil gas, and containing 260 grams (2.2 mols) of para-methyl styrene, was added dropwise during a period of one and one-half hours to 2166 cc. of an 8.7% aqueous chlorourea solution containing 2.0% of urea hydrochloride. The temperature slowly increased to a maximum of 38° C. during this period. The reaction was continued for an additional period of thirteen and one-half hours.

The aqueous solution was extracted twice with ether, after which the ether extracts were washed with a 5% aqueous solution of sodium carbonate, then with water until neutral. The ether extract was then dried with anhydrous sodium sulfate.

Ether was removed from the crude reaction product by distillation at atmospheric pressure, after which the residue was distilled under reduced pressure. A total of 136 grams of para-methyl styrene chlorohydrine was obtained, having the following physical properties.

Boiling range = 105–110° C. @ 5 mm., absolute
Density ($d\ 20/4$) = 1.1628
Refractive index ($n\ 20/D$) = 1.54769

Another method for the preparation of halohydrine of substituted styrenes consists of the reaction of the substituted styrene with the desired halogen to form the corresponding dihalide, reacting the dihalide so formed with sulfur trioxide, and hydrolyzing the resulting product to form the desired halohydrine. This procedure is illustrated by the following reactions

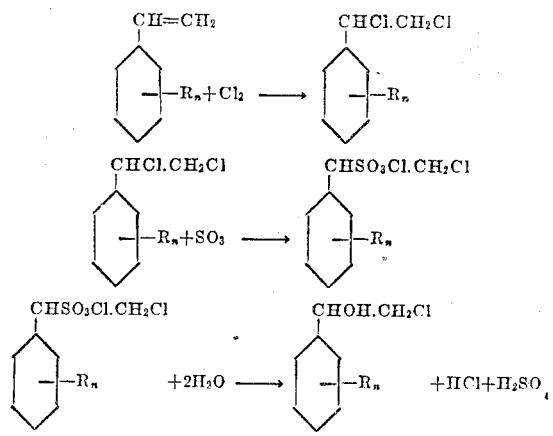

The addition of hypochlorous acid, either as such or by generation in situ, to substituted styrenes generally results in a product in which the α-isomer,

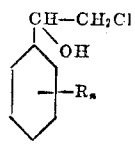

predominates, the β-isomer

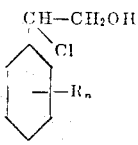

being present in lesser amount. In general, the β-isomer will be present in extremely small proportions, or entirely absent, in products obtained under normal operating conditions. Similar results are obtained when halohydrines other than chlorohydrines, (i. e., bromohydrines and iodohydrines) are prepared by the processes previously described.

Special methods should be used for the preparation of substituted styrene halohydrines in which the β-isomer predominates.

The halogen derivatives of substituted styrene may be used as solvents or plasticizing agents for the preparation of cellulosic lacquers or coating compositions, such as those prepared from cellulose nitrate, cellulose acetate, ethyl cellulose, or cellulose acetobutyrate. In addition, the substituted styrene halohydrines may be used as insecticides and fungicides, as refining agents for rosin and other natural and synthetic resins, and as solvents for refining lubricating stocks.

The use of substituted styrene halohydrines as plasticizing agents is illustrated by the following examples.

Example A

A mixture of 5 parts of nitrocellulose, 2.5 parts of ester gum, and 2.5 parts of para-methyl styrene chlorohydrine was dissolved in 40 parts of a thinner having the following composition.

| | Parts |
|---|---|
| Amyl acetate | 20 |
| Amyl alcohol | 10 |
| Isopropyl acetate | 13 |
| Ethyl alcohol | 3 |
| Toluol | 34 |
| Petroleum naphtha | 20 |

A clear, viscous, colorless lacquer was obtained.

A portion of this lacquer was applied to the surface of a tin plate panel, after which it was permitted to dry overnight. A clear, elastic, extensible, adherent, colorless film possessing very good mechanical properties was obtained.

Example B

A mixture of 4.55 parts of cellulose acetate and 2.45 parts of para-methyl styrene chlorohydrine was dissolved in 93 parts of a thinner having the following composition.

| | Parts |
|---|---|
| Acetone | 50 |
| "Cellosolve" | 20 |
| Toluene | 15 |
| Isoprene acetate | 15 |

A clear, viscous, colorless lacquer was obtained.

A portion of this lacquer was applied to the surface of a metal panel, after which it was permitted to dry during a period of twenty-four hours. A clear, adherent film possessing very good mechanical properties was obtained.

Example C

A mixture of 6.7 parts of ethyl celluose and 3.3 parts of para-methyl styrene chlorohydrine was dissolved in 40 parts of a thinner having the following composition.

| | Parts |
|---|---|
| Isoprene propionate | 20 |
| "Pentasol" | 10 |
| Isopropyl acetate | 13 |
| Ethyl alcohol | 3 |
| Toluol | 34 |
| Mineral spirits | 20 |

A clear, viscous, colorless lacquer was obtained.

A portion of this lacquer was flowed on to the surface of a sheet of tin plate, after which it was permitted to dry overnight. A clear, elastic, adherent film possessing very good mechanical properties was obtained.

The use of substituted styrene haloacetates as plasticizing agents is illustrated by the following examples:

Example D

A mixture of six parts of nitrocellulose, 2.5 parts of ester gum, and 1.5 parts of methyl styrene chloroacetate was dissolved in 40 parts of a thinner having the following composition:

| | Parts |
|---|---|
| Amyl acetate | 20 |
| Amyl alcohol | 10 |
| Isopropyl propionate | 13 |
| Ethyl alcohol | 3 |
| Toluol | 34 |
| Petroleum naphtha | 20 |

A viscous, light amber colored lacquer was obtained.

A portion of this lacquer was applied to the surface of a tin plate panel, after which it was permitted to dry for a period of 48 hours. A clear, elastic, extensible, adherent, colorless film possessing good mechanical properties was obtained.

Example E

A mixture of 4.55 parts of cellulose acetate and 2.45 parts of para methyl styrene chloroacetate was dissolved in 93 parts of a thinner having the following composition:

| | Parts |
|---|---|
| Acetone | 50 |
| "Cellosolve" | 20 |
| Toluene | 15 |
| Isoprene acetate | 15 |

A clear, viscous, colorless lacquer was obtained.

A portion of this lacquer was applied to the surface of a reduced steel panel, after which it was permitted to dry during a period of 48 hours. A clear, colorless, adherent film possessing good mechanical properties was obtained.

Example F

A mixture of 8.0 parts of ethyl cellulose and 2.0 parts of para methyl styrene chloroacetate was dissolved in 40 parts of a thinner having the following composition.

| | Parts |
|---|---|
| Isoprene acetate | 20 |
| "Pentasol" | 10 |
| Isopropyl acetate | 13 |
| Ethyl alcohol | 3 |
| Toluol | 34 |
| Mineral spirits | 20 |

A viscous, colorless lacquer was obtained.

A portion of this lacquer was flowed on to the surface of a sheet of metallic magnesium, after which it was permitted to dry overnight. A clear, elastic, adherent film possessing good mechanical properties was obtained.

It will be understood that other halogen derivatives of substituted styrenes may be prepared by the use of the corresponding halogen compounds as starting materials.

While I have more particularly described the preparation of substituted styrene chloroacetate by way of example in illustrating my invention as pertaining to the preparation of halogen-ester derivatives, generally, of substituted styrenes, it will be appreciated that by an appropriate choice from among the fatty acids such as propionic, butyric, valeric acids, etc., as starting materials the corresponding halopropionate, halobutyrate, halovalerate, etc., of substituted styrene may likewise be prepared, all in accordance with the methods of my invention.

It will be further understood that the foregoing is by way of disclosure and that changes, omissions, additions, substitutions, and/or modifications might be made within the scope of the claims without departing from the spirit of the invention.

I claim:

1. A process for preparing a halogen derivative of substituted styrene which comprises reacting a substituted styrene with a compound capable of yielding a hypohalogen acid under the conditions of reaction; said substituted styrene having the general structural formula:

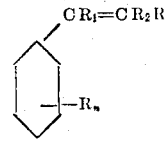

wherein R represents a substituent selected from the groups consisting of alkyl, aryl and aralkyl groups; $n$ represents the fact that from one to five substituents may be present in the nucleus; and $R_1$, $R_2$, and $R_3$ each represents a substituent selected from the groups consisting of hydrogen, alkyl, aryl and aralkyl groups.

2. A process for preparing a halogen derivative of substituted styrene which comprises reacting a material containing a substituted styrene with a compound capable of yielding a hypohalogen acid under the reaction conditions, and in the presence of a fatty acid; said substituted styrene having the general structural formula:

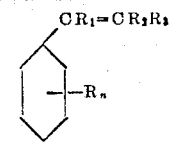

wherein R represents a substituent selected from the groups consisting of alkyl, aryl and aralkyl groups; $n$ represents the fact that from one to five substituents may be present in the nucleus; and $R_1$, $R_2$, and $R_3$ each represents a substituent selected from the groups consisting of hydrogen, alkyl, aryl and aralkyl groups.

3. A process for preparing a halohydrine of substituted styrene which comprises reacting a substituted styrene light oil fraction with a compound capable of yielding a hypohalogen acid; said substituted styrene having the general structural formula:

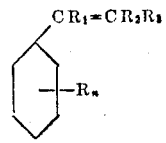

wherein R represents a substituent selected from the groups consisting of alkyl, aryl and aralkyl groups; $n$ represents the fact that from one to five substituents may be present in the nucleus; and $R_1$, $R_2$, and $R_3$ each represents a substituent selected from the groups consisting of hydrogen, alkyl, aryl and aralkyl groups.

4. A process for preparing a chlorohydrine of methyl styrene which comprises reacting a methyl styrene light oil fraction with hypochlorous acid.

5. A process for preparing a chlorohydrine of methyl styrene which comprises reacting a methyl styrene light oil fraction with tertiary butyl hypochlorite.

6. A process for preparing a chlorohydrine of methyl styrene which comprises reacting a methyl styrene light oil fraction with monochlorourea.

7. A process for preparing a chlorohydrine of methyl styrene which comprises reacting methyl styrene with hypochlorous acid.

8. A process for preparing a chlorohydrine of methyl styrene which comprises reacting methyl styrene with tertiary butyl hypochlorite.

9. A process for preparing a chlorohydrine of methyl styrene which comprises reacting methyl styrene with monochlorourea.

10. A compound having the following structural formula:

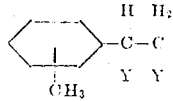

in which one Y represents a halogen, and the other Y represents a fatty acid radical.

11. A compound having the following structural formula:

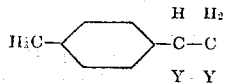

in which one Y represents a halogen, and the other Y represents a fatty acid radical.

12. A compound having the following structural formula:

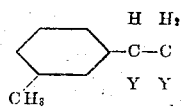

in which one Y represents a halogen, and the other Y represents a fatty acid radical.

FRANK J. SODAY.